United States Patent [19]

Hsu

[11] Patent Number: 5,081,856
[45] Date of Patent: Jan. 21, 1992

[54] LOCK INCORPORATING GEAR SHIFT LEVER

[76] Inventor: Yun-Tung Hsu, No. 9, Floor 2, Alley 2, Lane 437, Nei-Hu Rd., Sec. 1, Nei-Hu Dist., Taipei, Taiwan

[21] Appl. No.: 555,230

[22] Filed: Jul. 19, 1990

[51] Int. Cl.$^5$ .............................................. E05B 65/12
[52] U.S. Cl. ...................................... 70/247; 70/195; 70/254
[58] Field of Search .................................. 70/245–248, 70/237–239, 252, 254, 181, 192–195; 74/473, 523, 535

[56] References Cited

U.S. PATENT DOCUMENTS

| | | | |
|---|---|---|---|
| 999,462 | 8/1911 | Miller | 70/195 |
| 1,391,351 | 9/1921 | Voight | 70/195 |
| 1,487,603 | 3/1924 | Ratto | 70/195 |
| 1,694,863 | 12/1928 | Prigge | 70/254 |
| 1,866,309 | 7/1932 | Johnson | 70/254 X |
| 1,881,889 | 10/1932 | Noser | 70/254 X |
| 2,041,621 | 5/1936 | Sundin | 70/247 |
| 3,431,755 | 3/1969 | Eisenman | 70/181 |
| 3,583,184 | 6/1971 | Papale | 70/247 X |
| 4,231,241 | 11/1980 | Lipski | 70/195 |
| 4,936,158 | 6/1990 | Livshits et al. | 70/248 X |
| 4,938,042 | 7/1990 | Muramatsu | 70/245 |
| 4,955,935 | 9/1990 | Katayama | 70/252 X |

FOREIGN PATENT DOCUMENTS 2590857 6/1987 France .............................. 70/247

Primary Examiner—Rodney M. Lindsey
Assistant Examiner—Suzanne L. Dino
Attorney, Agent, or Firm—Townsend & Townsend

[57] ABSTRACT

A lockable gear shift lever comprising a lever member and a detachable handle section, the lever member having a rotatable key plug, a locking post, and a locking plate disposed adjacent to the lever member. The locking post is actuated by the rotatable key plug to engage and disengage from the locking plate to allow the lever member to be locked into a fixed position. The handle section is rotatably and detachably mounted to the top end of the lever member and includes a key extending downward which inserts into the key plug and is used to rotate the key plug relative to the lever member to lock and unlock the lever member relative to the locking plate. Thus, rotation of the handle locks and unlocks the gear shift lever. The handle also includes components to couple the handle and lever member together securely when used for normal driving operation, and includes a push button to facilitate movement of the lever between gear positions while shifting. When the lever is locked and the handle is removed, the gear shift lever cannot be operated thereby preventing unauthorized use.

13 Claims, 7 Drawing Sheets

# LOCK INCORPORATING GEAR SHIFT LEVER

BACKGROUND OF THE INVENTION

The invention relates to a lock device, and more particularly to a lock incorporating gear shift lever for an automobile.

There are many kinds of locks and other security devices available for use in an automobile. Some of them are directly installed by auto manufacturers and dealers; others are supplied by auto accessory shops. Electronic alarms are among the most popular types of security devices and are effective in some circumstances. But if the car is parked in a relatively deserted area and if the thief knows something about disconnecting them, these alarms co not provide adequate protection.

SUMMARY OF THE INVENTION

Therefore, the objective of this invention is to provide a lock incorporating gear shift lever for an automobile that prevents movement of the gear shift lever in the gear shift box, thus preventing the automobile itself from being stolen.

Another object of this invention is to provide a lock incorporating gear shift lever wherein the lock is operated by a key disposed on one end of a handle section, which is therefore detachable.

Accordingly, the preferred embodiment of a lock incorporating gear shift lever of this invention comprises a rotatable plug, a lever member having an axial hollow space to receive the rotatable plug and a transverse first through bore formed below the axial hollow space, a locking plate disposed adjacent the lever member and having a first receiving hole aligned with the transverse first through bore, and a spring loaded locking post housed in the transverse first through bore, one end of which being urged to engage the locking plate at the first receiving hole. The locking post is actuated by the rotatable plug to disengage from the locking plate when the plug is rotated. A longitudinal handle section is rotatably and detachably mounted to a top end of the lever member to rotate the plug relative to the lever member to permit movement of the locking post away from the locking plate.

The plug has an axial first keyway, a top end with a keyhole communicated with the keyway, and a plurality of first tumbler holes communicated with the axial first keyway. The lever member further has a plurality of second tumbler holes aligned with the first tumbler holes. The handle section has an axial second keyway. A plurality of tumbler pins extends into the first and the second tumbler holes. A key is disposed inside the axial second keyway and has one end with key bit projections extending out of the handle section and into the axial first keyway to actuate the tumbler pins. The handle section is rotated to allow the key to rotate the plug.

The plug has a bottom end and a rectangular projection extending from the bottom end. The lever member has a second bore extending downward from the axial hollow space and communicated with the transverse first through bore. The rectangular projection of the plug extends inside the second bore and engages a notch in the locking post so as to move the locking post.

The handle section has a hand grip with a second recess, an axial guide groove having a top end opening at the second recess, and a bottom end with a substantially oval shaped wall that confines a central depression. A control pin is disposed inside the axial guide groove and has a top restricted end extending into the second recess and a bottom restricted end extending into the central depression. A biasing member urges the bottom restricted end of the control pin away from the central depression. A cover is disposed on the top end of the lever member inside the central depression of the handle section. The cover is a hollow cylinder having a top annular wall with a through hole to receive the bottom restricted end of the control pin and a central opening to receive the top end of the plug. A stop plate is hinged to the hand grip at the second recess. The stop plate prevents the top restricted end of the control pin from extending into the second recess when the top restricted end is pressed to force the bottom restricted end to project into the through hole of the cover to prevent rotation of the handle section relative to the cover.

The handle section has three first hook grooves formed on the bottom end above the central depression and three first hook members formed at the first hook groove. The top wall of the cover has three second hook grooves to be aligned with the first hook grooves. A substantially ring shaped rotatable drive member has three cam faces and is received in the cover and fixed around the plug. Three spring loaded second hook members are disposed inside the second hook groove and have a base portion abutting the cam faces. Rotation of the plug correspondingly rotates the drive member. The second hook members are cammed by the drive member to move upward and engage the first hook member.

The lever member further has a transverse second through bore disposed below the axial hollow space and parallel to the transverse first bore. The locking plate further has a plurality of second receiving holes offset from the first receiving hole and arranged in a curve corresponding to different gear positions of the lever member: first gear position, second gear position, third gear position, neutral gear position, reverse gear position, etc. A lever positioning means is disposed inside the transverse second through bore and has one end urged towards one of the second receiving holes. A push button is mounted on the handle section. A hollow housing member is connected to one side of a periphery of the cover and a periphery of the lever member. A transmission mechanism, interconnecting the push button and the lever positioning means, is mounted in the housing member. The transmission mechanism moves the lever positioning means away from the locking plate when the push button is pressed.

BRIEF DESCRIPTION OF THE DRAWINGS

Other features and advantages of this invention will become apparent in the following detailed description of the preferred embodiment with reference to the accompanyiny drawings, in which.

DETAILED DESCRIPTION OF THE PREFERRED EMBODIMENT

Figure 1:
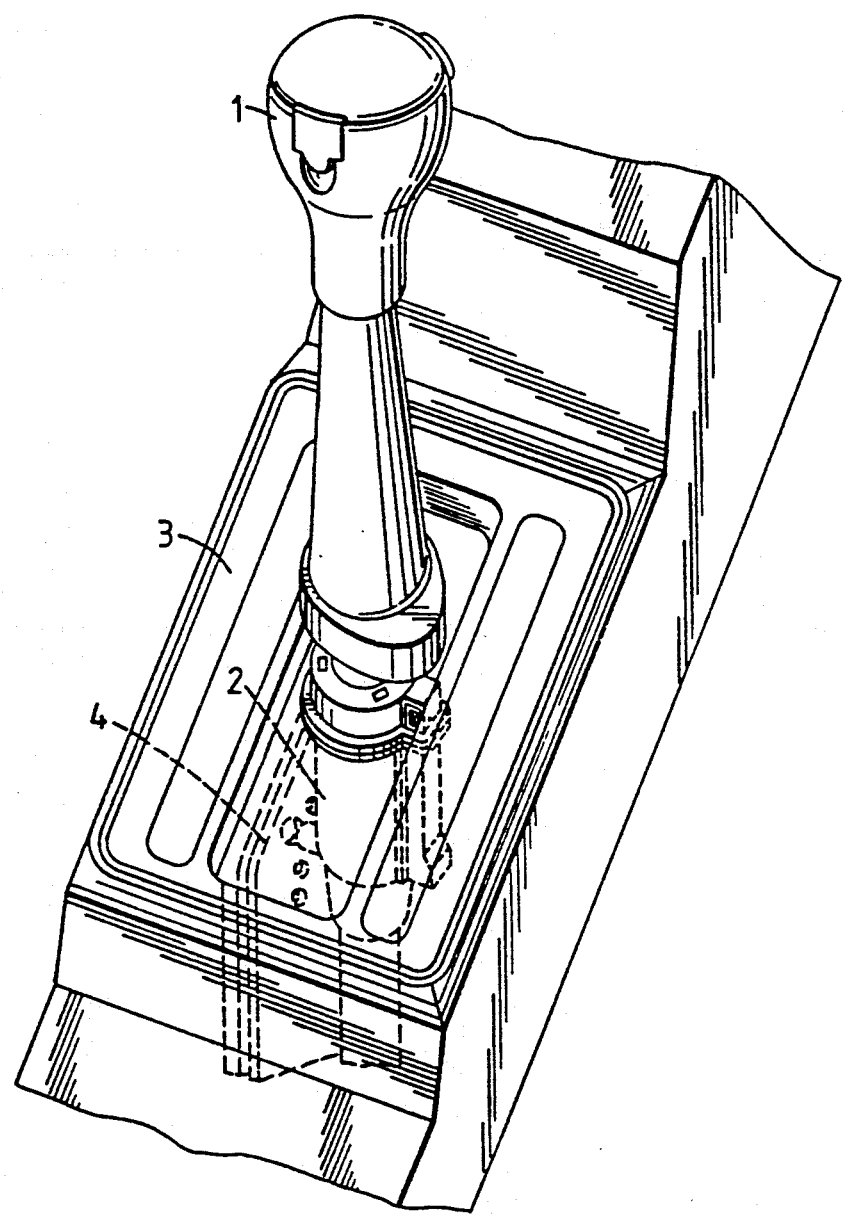
FIG. 1 is an illustration of the preferred embodiment according to the present invention.

Referring to FIG. 1, the preferred embodiment of a lock according to the present invention comprises a handle section 1, a gear shift lever 2, a gear shift box 3, and a locking plate 4 disposed between the gear shift lever 2 and the gear shift box 3. The gear shift lever 2 includes the lock mechanism which, when actuated, fixes the gear shift lever 2 to the locking plate 4. The handle section 1 can be detached from the gear shift lever 2, making it extremely difficult to transmit the necessary force to move the gear shift lever 2 should the lock mechanism be successfully picked. The key to the lock mechanism is incorporated in the handle section 1.

Figure 2:
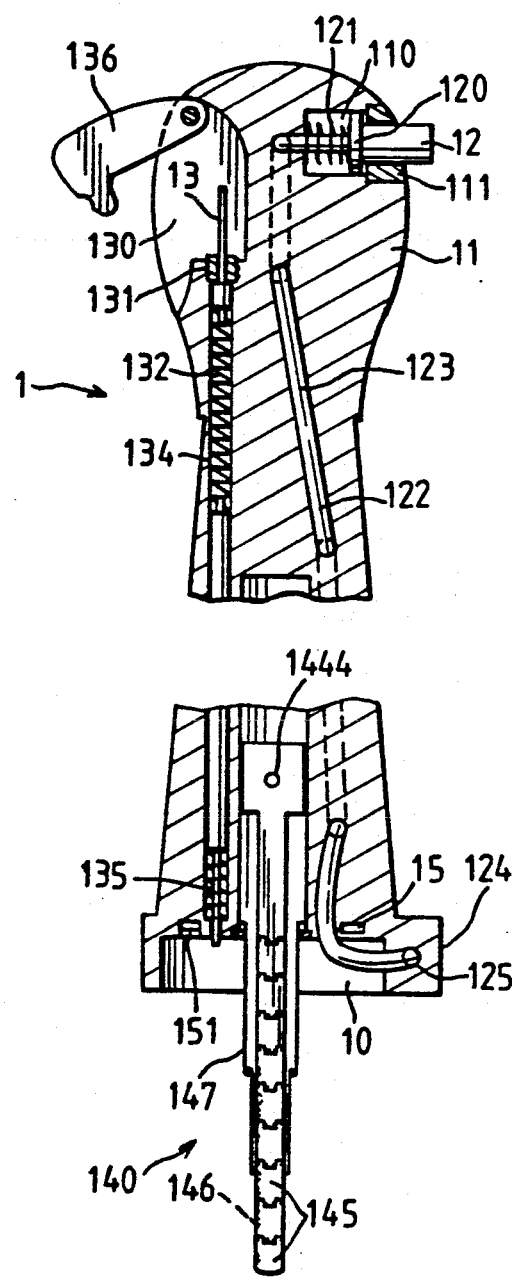
FIG. 2 is a sectional view of a handle section of the preferred embodiment.

Referring to FIG. 2, the handle section 1 is shown to comprise a hand grip 11 with a push button 12 and a control pin 13. The push button 12 is disposed inside a groove 110 of the hand grip 11 and is biased outward from the same by a spring member 121 being held in the groove 110 by a flange 120 on the base of the push button 12. The flange 120 abuts a shoulder 111 at the outer edge of the groove 110. The handle section 1 has a substantially oval shaped wall that confines a central depression 10 at its bottom end and a curved longitudinal groove 123 which receives a cord 122. The cord 122 has its top end connected to the push button 12 and its bottom end 125, following the path of the longitudinal groove 123, bending to extend into the central depression 10.

The control pin 13 is disposed inside an axial guide groove 134. The control pin 13 is comprised of three integrally connected sections: a central thick cylindrical portion, and a top and a bottom thinner cylindrical section, heretofore referred to as top and bottom restricted ends. The top restricted end of the control pin 13 normally passes through and extends out of a threaded bolt member 131 and into a recess 130 in the hand grip 11, opposite the push button 12. A spring member 132 provides biasing between the control pin 13 and the bolt member 131. A portion of the bottom restricted end of the control pin 13 projects out of the axial guide groove 134 into the central depression 10 in the bottom of the handle section 1. A spring member 135 surrounds the portion of the bottom restricted end of the control pin 13 inside the axial guide groove 134 to urge the control pin 13 upward.

The handle section 1 further includes a stop plate 136 hinged to the hand grip 11 at the recess 130. When sufficient force has been applied to the top restricted end of the control pin 13 to force the control pin 13 downward, the stop plate 136 can be moved into the recess 130 in the hand grip 11 to engage the control pin 13 and prevent it from coming back up. Thus, for as long as the stop plate 136 engages the control pin 13, the bottom restricted end of the control pin 13 fully extends into the central depression 10. Moving the stop plate 136 away from the hand grip 11 disengages it from the control pin 13 and allows the spring 135 to expand, so the top restricted end of the control pin 13 once more extends out of the bolt member 131 and the bottom restricted end of the control pin 13 retracts into the axial guide groove 134.

Figure 3:
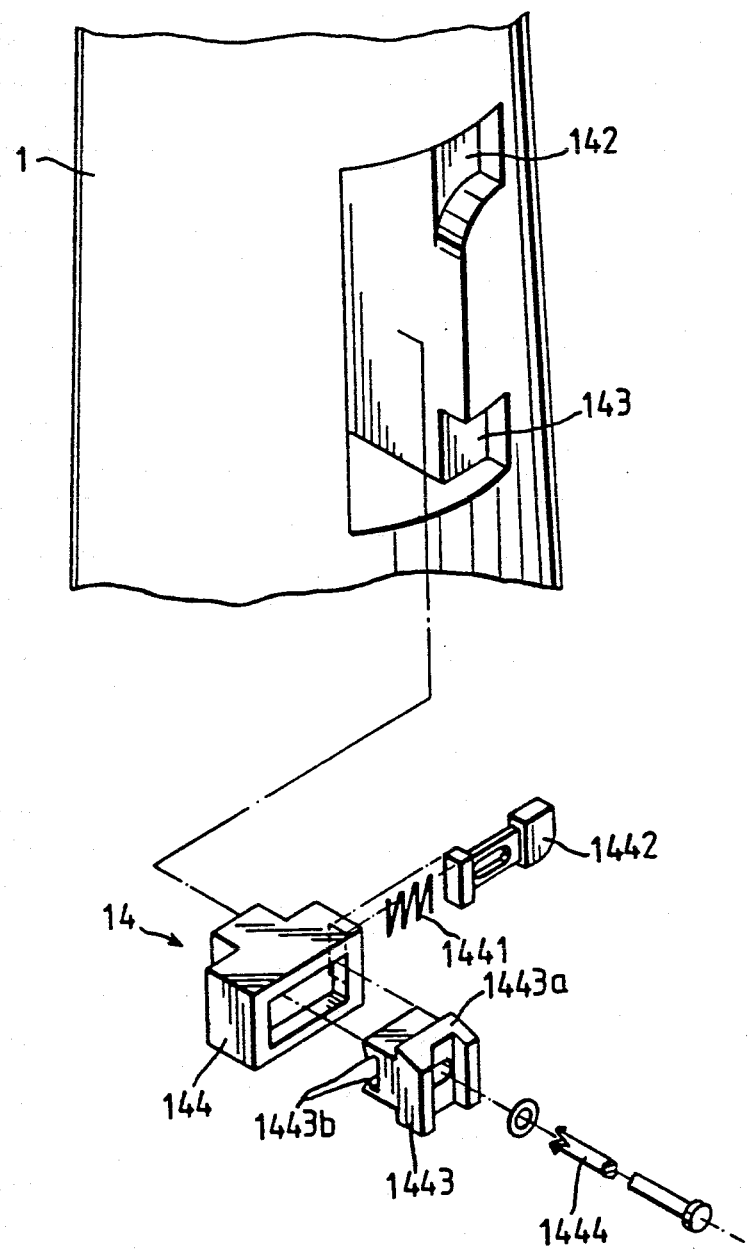
FIG. 3 is an enlarged exploded view of a central portion of the handle section.

Referring to FIGS. 2 and 3, the central portion of the handle section 1 has a substantially rectangular key control groove 141 with upper and lower corner notches 142 and 143. A key control piece 14 comprises a hollow body 144 having an open and a closed end; a locking piece 1442 disposed inside the hollow body 144; a spring member 1441 biasing the locking piece 1442 to project out of the hollow body 144; and a slide piece 1443 having a knob portion 1443a which projects out of the open end of the hollow body 144 and a pair of longitudinal flanges 1443b formed on a side opposite the knob portion 1443a and serving as clamping rails for the locking piece 1442. A fastening pin 1444 extends into the slide piece 1443, through the locking piece 1442 and the hollow body 144, serves to attach a key 140 to the closed end of the hollow body 144. The key 140 is disposed inside an axial keyway 1410, located at the heart of the handle section 1, and extends out in the central depression 10 of the handle section 1. The hollow body 144 can move up or down the key control groove 141 between two positions defined by the engagement of the locking piece 1442 with the upper or lower corner notches 142 and 143. The slide piece 1443 is used to disengage the locking piece 1442 from the corner notches 142 and 143 to permit movement of the hollow body 144. Movement of the hollow body 144 thus extends or retracts the key 140, towards or away from the tumbler pins found in the gear shift lever 2 (This will be discussed in greater detail in the succeeding paragraphs).

The handle section 1 further has three spaced hook grooves 15 formed above the central depression 10. A first hook member 151 projects from each of the spaced hook grooves 15. The key 140 comprises a chain of knuckles 145 having key bit projections 146 to actuate the tumbler pins of the gear shift lever 2. The chain of knuckles 145 is disposed inside a telescopic cover member 147. The construction of the key 140 is known in the art and will not be detailed herein.

Figure 4:
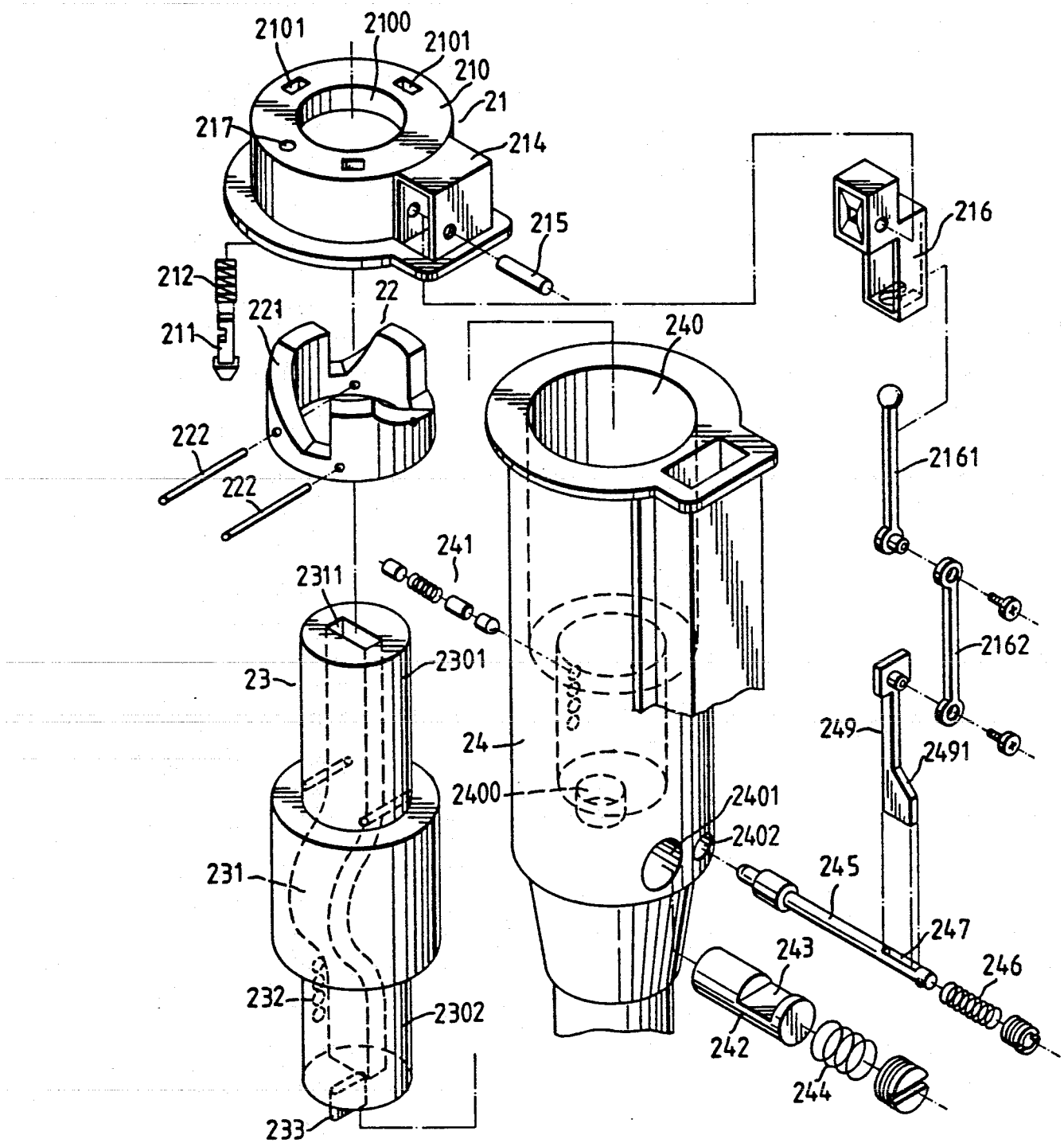
FIG. 4 is an exploded view of a lever member of the preferred embodiment.

Referring to FIG. 4, the gear shift lever 2 comprises a cover 21, a drive member 22, a keyplug 23 and a lever member 24.

The cover 21 is formed as a hollow cylinder with a top annular wall 210 having a thickness A, a central circular opening 2100, and three spaced hook grooves 2101 near the periphery of the circular opening 2100. A housing member 214 that confines a rectangular hollow space is connected contiguously to one side of the periphery of the cover 21. A pivoted member 216 is hinged within the housing member 214 by a pin 215. The cover 21 is to be received in the central depression 10 of the handle section 1. The top annular wall 210 of the cover 21 further has a through hole 217 that receives the bottom restricted end of the control pin 13.

The drive member 22 is substantially ring-shaped and has three curved cam faces 221. The keyplug 23 is a cylindrical member, which like the control pin 13, is comprised of three integrally connected sections: a central thicker section and an upper and a lower thinner section hereinafter referred to as restricted ends 2301 and 2302. The keyplug 23, according to the preferred embodiment, has an axial keyway 231 that is curved. The restricted end 2302 is formed with a plurality of tumbler holes 232 intercommunicated with the keyway 231. The restricted end 2301 has a keyhole 2311 communicated with the keyway 231 to serve as an entrance for the key 140 of the handle section 1. The drive member 22 is sleeved around the restricted end 2301 and is fixed there by pins 222. The keyplug 23 further has a rectangular projection 233 centered on and projecting from the bottom end, opposite the keyhole 2311.

The lever member 24 has an axial hollow space 240 to receive the keyplug 23. The lever member 24 has a plurality of tumbler pins 241 which project into the axial hollow space 240 and thence into the keyplug 23 through the tumbler holes 232. The lever member 24 further has transverse through bores 2401 and 2402. A locking post 242 is received in the transverse through bore 2401 and has a notch 243. The rectangular projection 233 projects into a bore 2400 extending downward from the axial hollow space 240, which is communicated with the transverse bore 2401. The rectangular projection 233 engages the locking post 242 at the notch 243. A biasing member 244 is provided to urge the locking post 242 towards the locking plate 4 (not shown). A lever positioning means 245 is disposed inside the transverse through bore 2402 parallel to the locking post 242. A biasing member 246 similarly urges the lever positioning means 245 so one of its ends projects out of the lever member 24 and engages the locking plate 4. The lever positioning means 245 has an elongated slot 247 and an inclined groove (not shown) communicated therewith. The lever positioning means 245 receives one end of a cam piece 249 of a transmission mechanism. The other end of the cam piece 249 is connected to a first limb member 2162. A second limb member 2161 of the transmission mechanism, hinged to the first limb member 2162, is connected to the pivoted member 216.

Figure 6:
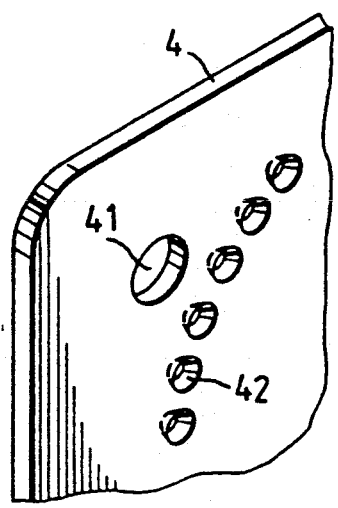
FIG. 6 is an illustration of a locking plate of the preferred embodiment.

FIG. 6 is an illustration of the locking plate 4 of the present invention. The locking plate 4 has a first receiving hole 41 to receive one end of the locking post 242 and a plurality of second receiving holes 42 arranged in a curve to receive one end of the lever positioning means 245. Each of the second receiving holes 42 correspond to a gear position of the gear shift lever 2.

Figure 7A:
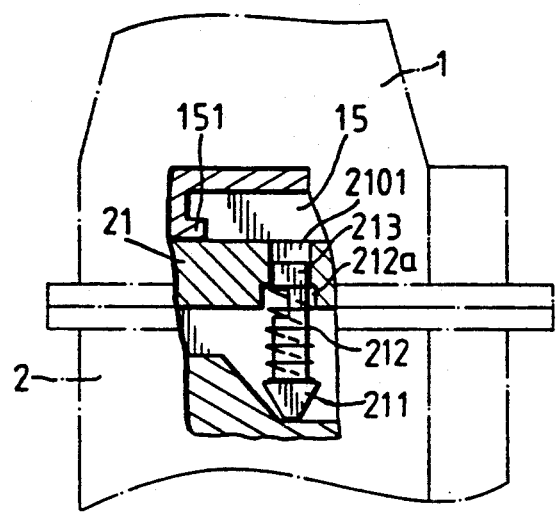
FIGS. 7A and 7B illustrate the engagement of the handle section and the lever member of the preferred embodiment.
Figure 7B:
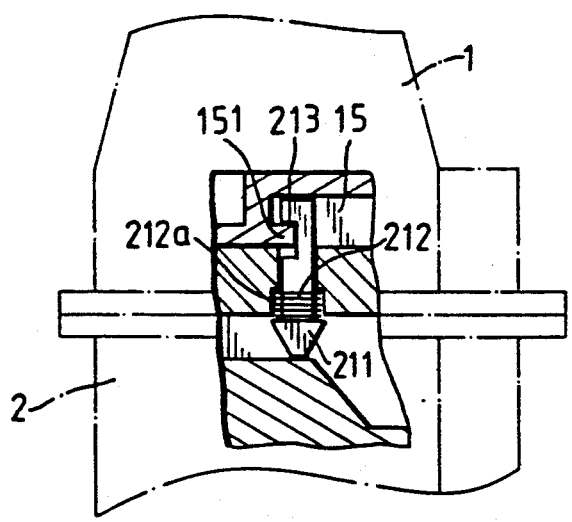

Referring to FIGS. 7A and 7B in combination with FIG. 4, each of the hook grooves 2101 of the cover 21 houses a second hook member 211 and a spring member 212 loosely fitted around the second hook member 211. The hook groove 2101 has a shoulder 212a to allow the spring member 212 to bias the second hook member 211 downward and prevent the spring member 212 from extending out of the hook groove 2101. The second hook member 211 has a base portion seated on one of the cam faces 221 of the drive member 22. The rotation of the keyplug 23 will correspondingly rotate the drive member 22. The second hook member 211 is forced by the cam face 221 of the drive member 22 to move upward and extend out of the hook groove 2101. The second hook member 211 has a notch 213 to engage the first hook member 151 of the handle section 1. This is the method of engagement of the handle section 1 with the gear shift lever 2.

Figure 8:
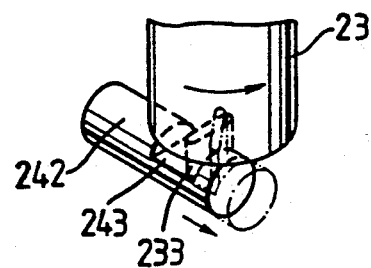
FIG. 8 illustrates the movement of a locking post of the lever member shown in FIG. 4.

When the keyplug 23 is rotated, the position of the rectangular projection 233 on the notch 243 of the locking post 242 is changed such that the locking post 242 moves against the action of the biasing member 244. The locking post 242 thus disengages with the first receiving hole 41 of the locking plate 4. (Refer to FIG. 8).

When the lock is in an opened state, the through hole 217 on the top wall 210 of the cover 21 is aligned with the axis of the control pin 13. The control pin 13 is pressed downward so that its bottom restricted end projects into the through hole 217. The stop plate 136 is then moved into the recess 130 of the hand grip 11 to lock the control pin 13 in the engaged position, preventing movement of the handle section 1 relative to the cover 21.

Figure 5:
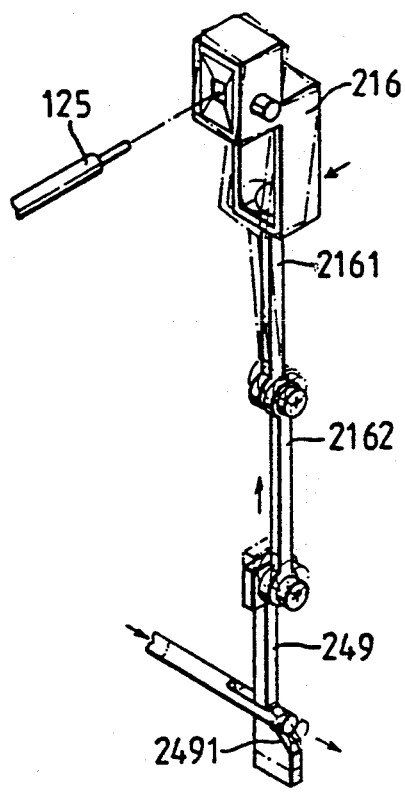
FIG. 5 illustrates the operation of a transmission mechanism of/the lever member shown in FIG. 4.
Figure 9:
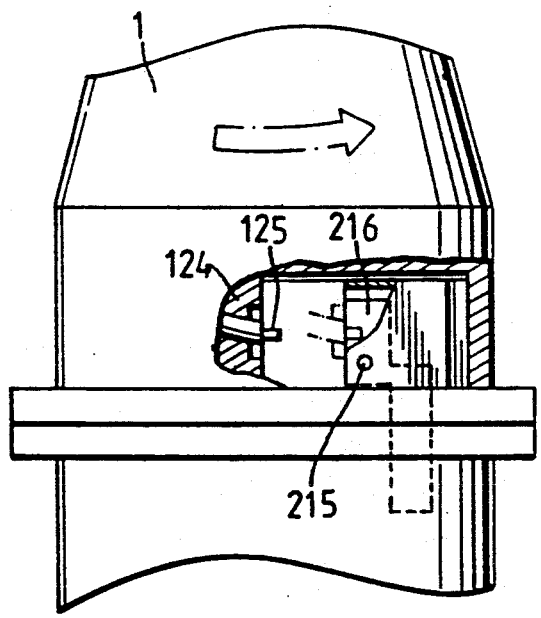
FIG. 9 shows the actuation of the transmission mechanism.

Referring to FIGS. 2, 5 and 9, depressing the push button 12 will extend the end 125 of the cord 122 to rotate the pivoted member 216 in a clockwise direction, thus pulling the cam piece 249 upward. An upward movement of the cam piece 249 enables an inclined side 2491 of the same to come into contact with the inclined groove of the lever positioning means 245, thus retracting the lever positioning means 245 against the action of the biasing member 246. The lever positioning means 245 serves as a means for maintaining the gear shift lever 2 at a desired gear position by fixing the gear shift lever 2 to the locking plate 4.

When the gear shift lever 2 is to be placed in a neutral position, the push button 12 is pressed to disengage the lever positioning means 245 from the locking plate 4. The gear shift lever 2 is then moved to the neutral position and the push button 12 is released to allow the lever positioning means 245 to extend back into the second receiving hole 42 which corresponds to the neutral position. The stop plate 136 of the handle section 1 is then moved away from the hand grip 11 to disengage the control pin 13 from the cover 21. The handle section 1 can then be rotated, thus allowing the key 14 to rotate the keyplug 23. Rotation of the keyplug 23 correspondingly rotates the drive member 22. The second hook members 211 move down the cam surfaces 221 of the drive member 22 and disengage from the first hook members 151 of the handle section 1. The locking post 242 once more extends into the first receiving hole 41 of the locking plate 4. The slide piece 1443 can then be used to move the locking piece 1442 to the upper corner notch 142. The key 140 is consequently retracted up the axial keyway 1410 and ceases to actuate the tumbler pins 241. The handle section 1 can now be removed from the gear shift lever 2.

Once the handle section 1 is removed from the gear shift lever 2, the tumbler pins 241 prevent the movement of the keyplug 23 relative to the lever member 24. When the keyplug 23 is rotated to remove the key 140, the rectangular projection 233 on the bottom thereof ceases to defeat the biasing member 244 urging the locking post 242, so the locking post 242 extends back into the first receiving hole 41, thus preventing any movement of the gear shift lever 2 relative to the locking plate 4.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:
1. A lock incorporating gear shift lever, comprising:
a rotatable key operable plug having an axial first keyway;
a lever member having an axial hollow space to receive said rotatable plug and a transverse first through bore formed below said axial hollow space;

a locking plate disposed adjacent to said lever member and having a first receiving hole aligned with said transverse first through bore;

a locking post received inside said transverse first through bore and having one end biased to engage said locking plate at said first receiving hole, said locking post being actuated by said plug to disengage from said locking plate when said plug is rotated;

a longitudinal handle section rotatably and detachably mounted on a top end of said lever member and having a key extending substantially downwardly into said axial first keyway, said handle section being rotated about the axis of said lever member so as to rotate said key plug and cause movement of said locking post towards or away from said locking plate; and means for releasably locking said handle section against said lever member when said handle section is attached to said lever member.

2. The lock incorporating gear shift lever of claim 1, wherein said plug has a plurality of first tumbler holes communicated with said axial first keyway; said lever member further having a plurality of second tumbler holes aligned with said first tumbler holes; said handle section having an axial second keyway, said key being disposed inside said axial second keyway; said locking incorporating gear shift lever further comprising a plurality of tumbler pins extending into said first and said second tumbler holes; said key having one end with key bit projections extending into said axial first keyway to actuate said tumbler pins, said handle section being rotatable to allow said key to rotate said plug.

3. The lock incorporating gear shift lever as claimed in claim 2, wherein said plug further has a bottom end and a rectangular projection extending from said bottom end; said lever member having a second bore extending downward from said axial hollow space and being communicated with said transverse first through bore, said rectangular projection of said plug projecting into said second bore; said locking post having a notch, said rectangular projection engaging said notch so as to move said locking post.

4. The locking incorporating gear shift lever of claim 3, wherein said handle section has a hand grip with a recess, an axial guide groove having a top end opening at said recess, and a bottom end with a central depression; said releasable locking means comprising:

a control pin disposed in said axial guide groove and having a top restricted end normally extending into said recess in a bottom restricted end normally extending into said central depression;

means for urging said bottom restricted end of said control pin away from said central depression;

a cover on top of said lever member and disposed inside said handle section at said central depression, said cover having a cylindrical wall, and a top annular wall with a through hole to receive said bottom restricted end and a central opening to receive said top end of said plug; and a stop plate hinged to said hand grip at said recess, said stop plate preventing said first restricted end from extending into said recess when said top restricted end is forced downward, thereby causing said bottom restricted end to project into said through hole of said cover to prevent rotation of said handle section relative to said cover.

5. The lock incorporating gear shift lever as claimed in claim 4, wherein said key comprises a chain of knuckles formed with said key bit projections.

6. The lock incorporating gear shift lever as claimed in claim 5, wherein said axial first keyway is curved.

7. The lock incorporating gear shift lever as claimed in claim 5, wherein said handle section has a key control groove intercommunicated with said second axial keyway, said key control groove having an upper corner notch and a lower corner notch; said lock incorporating gear shift lever further comprising a key control piece movably provided in said key control groove to selectively engage one of said upper corner notch and said lower corner notch, said key being fastened to said key control piece, said key actuating said tumbler pins when said key control piece engages said lower corner notch.

8. The lock incorporating gear shift lever as claimed in claim 7, wherein said key control piece includes a hollow body, a locking piece disposed inside said hollow body and biased to project out of the same, and a hand operated slide piece contained inside said hollow body and connected to said locking piece, said locking piece being moved by said slice piece between an engaged or a disengaged position in either of said upper and said lower corner notches.

9. The lock incorporating gear shift lever of claim 4, wherein said handle section has a first hook groove formed on said bottom end above said central depression, said handle section having a first hook member formed at said first hook groove; said top wall of said cover having a second hook groove aligned with said first hook groove; said releasable locking means further comprising:

a substantially ring shaped rotatable drive member having a cam face, said drive member being received in said cover and fixed around said plug; and a spring loaded second hook member movably disposed inside said second hook groove and having a base portion abutting said cam face;

whereby, rotation of said plug correspondingly rotates said drive member, said second hook member is caused by said drive member to move upward and engage said first hook member.

10. The lock incorporating gear shift lever as claimed in claim 4, wherein said lever member further has a transverse second through bore disposed below said axial hollow space and parallel to said transverse first bore; said locking plate further having at least one second receiving hole offset from said first receiving hole and to be aligned with said second receiving hole; said lock incorporating gear shift lever further comprising:

a lever positioning means disposed inside said transverse second bore and having one end biased towards said second receiving hole;

a push button mounted on said handle section;

a hollow housing member axially extending and connected to one side of the periphery of said cover and a periphery of said lever member; and a transmission mechanism interconnecting said push button and said lever positioning means and mounted in said housing member, said transmission mechanism moving said lever positioning means away from said locking plate when said push button is pressed.

11. The lock incorporating gear shift as claimed in claim 10, wherein said transmission mechanism comprises:
- a cam piece movably connected to said positioning means to force said lever positioning means to move away from said locking plate when said cam piece is actuated;
- a pivoted member movably disposed inside said housing member adjacent to said cover;
- a limb member interconnecting said pivoted member and said cam piece; and
- a cord extending longitudinally inside said handle section and having one end connected to said push button and a bottom end projecting out of said handle section to actuate said pivoted member when said push button is pressed;

whereby, actuation of said pivot member inside said housing member will pull said limb member and said cam piece upward to urge said lever positioning means to move away from said locking plate and disengage said second receiving hole.

12. The lock incorporating gear shift lever as claimed in claim 11, wherein said handle section has a substantially oval shaped hollow wall that confines said central depression and surrounding said cover; said bottom end of said cord extending into said central depression so as to actuate said pivoted member.

13. The lock incorporating gear shift lever as claimed in claim 10, wherein said locking plate comprises a plurality of said second receiving holes arranged in a curve and corresponding to different gear positions of said lever member.

* * * * *